United States Patent [19]
Fisher

[11] Patent Number: 5,509,381
[45] Date of Patent: Apr. 23, 1996

[54] METHOD OF AND MEANS FOR COOLING AND LUBRICATING AN ALTERNATOR

[75] Inventor: Uriyel Fisher, Haifa, Israel

[73] Assignee: Ormat Industries Ltd., Yavne, Israel

[21] Appl. No.: 340,431

[22] Filed: Nov. 14, 1994

Related U.S. Application Data

[63] Continuation of Ser. No. 968,526, Oct. 29, 1992, abandoned.

[51] Int. Cl.$^6$ ........................................................ F01P 1/06
[52] U.S. Cl. ............................... 123/41.31; 123/196 R; 310/54
[58] Field of Search ........................... 123/41, 31, 196 R; 310/54, 61, 62, 63

[56] References Cited

U.S. PATENT DOCUMENTS

| | | | |
|---|---|---|---|
| 3,562,564 | 2/1971 | Potter | 310/54 |
| 4,284,913 | 8/1981 | Barnhardt | 310/54 |
| 5,019,733 | 5/1991 | Kano et al. | 310/54 |

*Primary Examiner*—Noah P. Kamen
*Attorney, Agent, or Firm*—Donald M. Sandler

[57] ABSTRACT

An alternator of an internal combustion engine is cooled by oil circulated from an engine crankcase. The oil is sprayed directly on the rotor and stator components. Two pumps deliver oil to and from the alternator, respectively.

17 Claims, 2 Drawing Sheets

METHOD OF AND MEANS FOR COOLING AND LUBRICATING AN ALTERNATOR

This application is a continuation of application Ser. No. 07/968,526, filed Oct. 29, 1992, now abandoned.

TECHNICAL FIELD

The present invention relates to a method of and means for cooling an alternator.

BACKGROUND OF THE INVENTION

Large vehicles, such as trucks and heavily instrumented transporters, require high energy alternators to supply the electrical requirements of such vehicles. Because of space considerations, such alternators are usually very compact and as result, they generate a considerable amount of heat that must be dissipated in order to prevent damage to the alternator.

Conventionally, cooling is achieved by constructing the housing of the alternator in the form of double walls and pumping coolant through these walls. In some cases, engine coolant is used, and the coolant pump of the engine serves to exchange coolant between the radiator of the vehicle and the alternator housing. In other cases, lubricating oil is the coolant, and the engine pump that circulates lubricating oil through the engine is used for exchanging oil between the crankcase sump and the alternator housing, the oil cooler of the engine serving to dissipate heat produced by the alternator.

Instead of using the engine coolant pump for circulating coolant through the alternator housing, an auxiliary pump driven by the engine can be used. In either event, the indirect nature of the heat transfer process makes this approach inefficient.

Another expedient is to spray lubricating oil from the engine inside the alternator housing into direct contact with the rotor and stator of the alternator. This approach extracts heat more efficiently inasmuch as a direct type of heat transfer is involved, but requires another pump to scavenge oil from the housing thus complicating the installation, operation, and maintenance of the alternator.

It is therefore an object of the present invention to provide a new and improved method of and means for cooling an alternator which overcomes many of the deficiencies of the prior art.

BRIEF DESCRIPTION OF INVENTION

According to the present invention, the alternator of an internal combustion engine is cooled by pumping oil from a sump, such as the crankcase sump of the engine, into the interior of the housing for the alternator for the purpose of directly cooling the rotor and stator components. Oil inside the housing collects in a sump and is pumped back to the crankcase sump. One pump is provided to pump oil from the crankcase sump into the housing, and another pump is provided to pump oil from the sump in the housing back to the crankcase sump. Both pumps are mounted on the alternator shaft in the interior of the housing and driven by mechanically coupling the shaft to the engine. Thus, the two pumps and the rotor of the alternator are mounted on, and driven by, the same shaft.

BRIEF DESCRIPTION OF THE DRAWINGS

An embodiment of the present invention is described by way of example with reference to the accompanying drawings.

DETAILED DESCRIPTION

Figure 1:
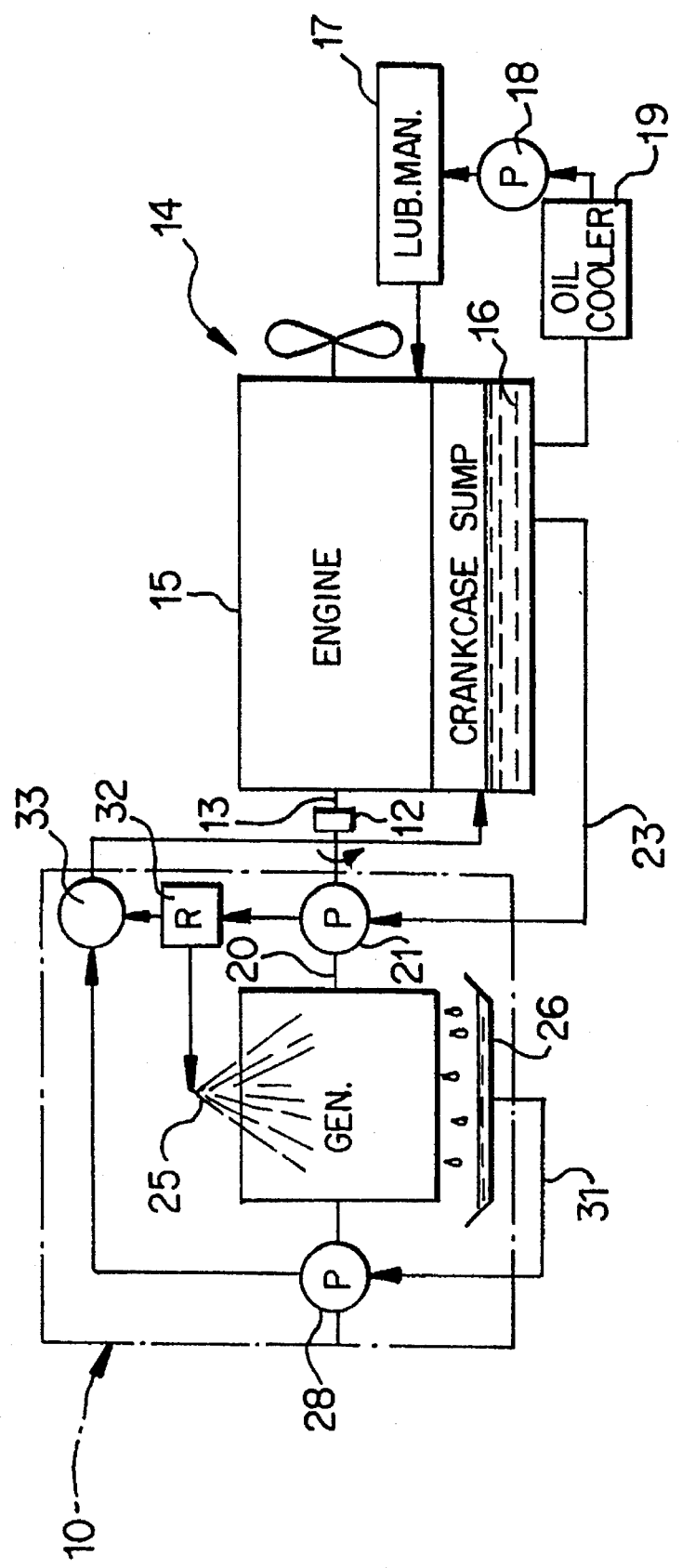
FIG. 1 is schematic block diagram of a alternator constructed according to the present invention.

Referring now to the drawings, reference numeral 10 in FIG. 1 shows an alternator according to the present invention coupled at 12 to shaft 13 driven by internal combustion engine 14 mounted in a vehicle (not shown). Engine 14 includes main engine block 15 containing the pistons and cylinders (not shown) and crankcase 16 located vertically below block 15 defining a sump for a lubricating oil supplied to the engine by lubricating manifold 17. Oil pump 18 serves to draw oil from sump 16 through oil cooler 19 and into the engine, in a conventional manner, for the purpose of lubricating the various bearings, pistons, etc. of the engine. This is a conventional arrangement and no details of the construction of this portion of the engine is necessary for those skilled in the art to understand the operation of the present invention.

Alternator 10 includes input shaft 20 for generating power in response to rotation of the shaft, and coupling 12 provides means for coupling the input shaft to engine 15 so that operation thereof drives the alternator. In addition to the input shaft, rotatable pump 21, having inlet and outlet ports is provided, the pump having means for being coupled to shaft 20 for effecting rotation of the pump in response to rotation of the shaft. Conduit 23 connects the inlet port of pump 21 to sump 16; and the outlet port of the pump is connected to spray means 25 directed towards the interior of the alternator for spraying oil from the sump directly onto the rotor and stator of the alternator thereby cooling the same.

The sprayed oil drains from the rotor and stator into alternator sump 26 where rotatable pump 28 mounted on shaft 20 is operative to draw oil from crankcase sump 26 to the inlet of the pump via conduit 31 and return the same through an outlet port to crankcase sump 16. Preferably, alternator 10, according to the present invention, is provided with pressure regulator 32 which is responsive to operation of pump 21 for regulating the pressure of oil flowing to spray means 25. That is to say, pressure regulator 32 maintains a fixed pressure at spray head 25 independently of engine speed. Excess pressure developed by pump 21 due to, for example, high engine speed operation, causes some of the oil pumped from sump 16 through pressure relief valve 33 to bypass the spray head and to be returned directly to the crankcase sump.

As described above, alternator 10, according to the present invention, preferably includes, within a single envelope, the rotor and stator of the alternator as well as pumps 21 and 28, and its control components, namely pressure regulator 32 and relief valve 33. As a consequence of this design, the alternator can be standardized for all types of vehicles with coupling 12 providing a connection by which a single type of alternator can be connected to many different types of engines. This materially simplifies maintenance of the alternator as well as reducing the cost of manufacture and operation because only a single alternator need be stocked for many different types of vehicles.

Figure 2:
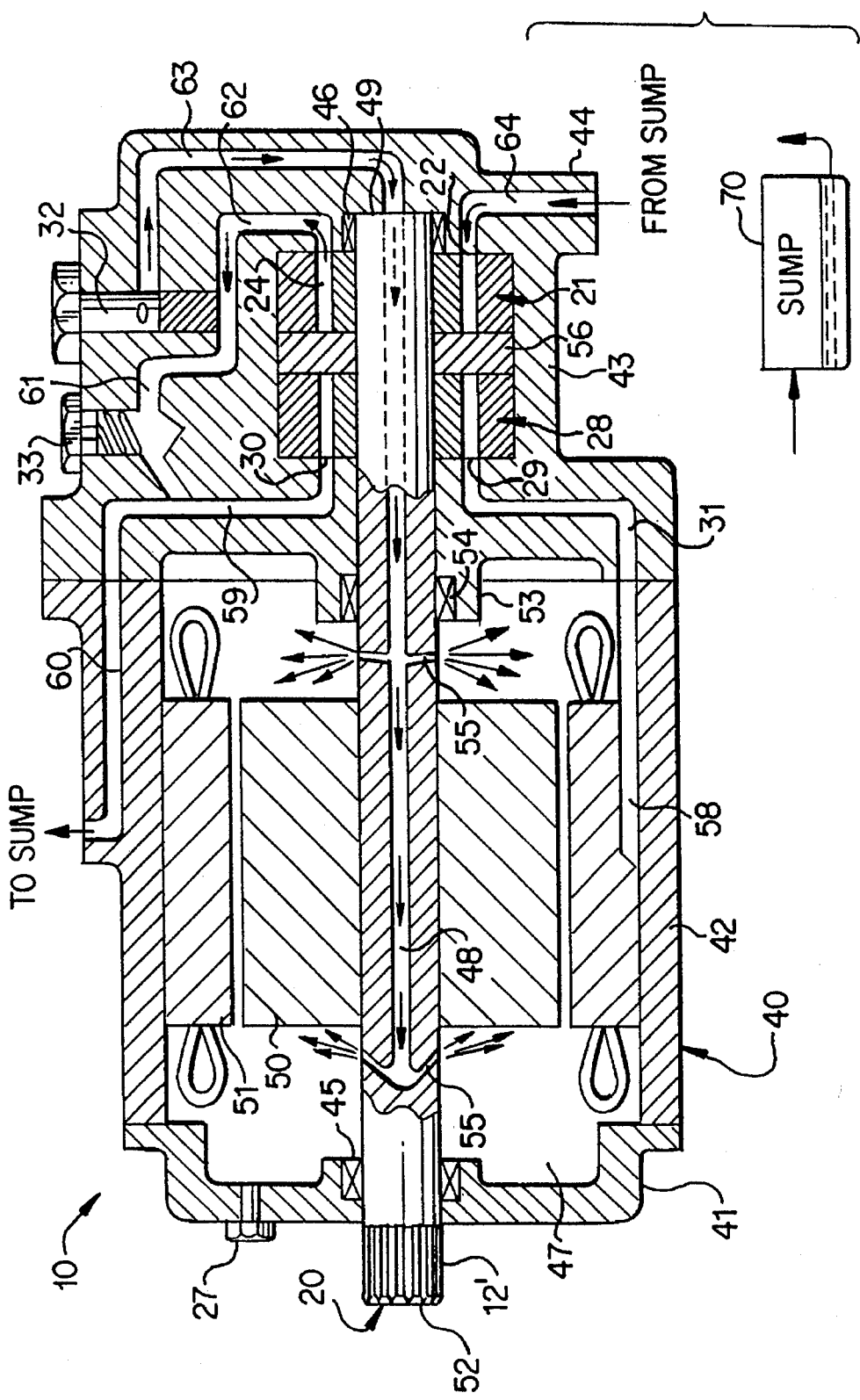
FIG. 2 is a vertical cross-section through the alternator constructed according to the present invention with parts shown in section.

The detailed construction of a alternator according to the present invention is shown in FIG. 2 to which reference is now made. Housing 40 of the alternator comprises three main portions, coupling-end case 41, main housing 42, pump housing 43. Alternatively, the housing may be constructed in four portions wherein pump housing has an end case depending on manufacturing considerations. Case 41 and pump housing 43 contain aligned bearings 45, 46, respectively, for rotatably receiving the axial ends of shaft 20 which passes through cavity 47 defined by housing 40. Axial bore 48 in shaft 20 extends from axial end 49 of the shaft located in end case 44 to a point beyond the axial end of rotor 50 that is rigidly attached to the shaft. Stator 51 of the alternator is rigidly attached to housing 42 and is operatively positioned relative to rotor 50 such as that rotation of shaft 20 causes the alternator defined by the rotor and the stator to produce electricity.

Axial end 52 of shaft 20 may be provided with splines 12', or the like, for coupling to the engine. Alternately, a pulley (not shown) may be rigidly attached to axial end 52 of shaft 20 for purpose of coupling the shaft to the engine via V-belt drive (not shown).

To better support shaft 20 in the housing, pump housing 43 is provided at one axial end with boss 53 which contains bearings 54 that are operably associated with and support the shaft. Between the free end of boss 53 and rotor 50, radial apertures 55 or provided in shaft 20 connected to bore 48. Radial bores 55 are provided in shaft 20 connected to bore 48 on the opposite axial face of rotor 50 so that pressurized oil in axial bore 48 of the shaft is sprayed into the cavity of main housing 42 into contact with the rotor and stator as well as bearings 54.

Pump housing 43 contains rotatable input pump 21 and rotatable output pump 28, each mounted co-axially on shaft 20, separator 56 spacing the pumps from each other and separating the fluid flow. Each of these pumps is standard in that they are gear-typed pumps which have inlet and outlets ports, and are similar in construction to the types of pumps provided in commercial oil burner equipment.

Pump housing 43 also incudes internal conduit 31 which connects inlet port 29 of pump 28 with alternator sump 58, and conduit 59 which connects outlet port 30 of pump 28 to port 60 in housing 42, the latter being connected via a conduit that is connected crankcase sump 16.

Housing portion 43 also contains conduit 61 which extends between pressure regulator 32 and pressure relief valve 33, this conduit being connected to conduit 62 in housing 44 which serves to connect outlet port 24 of pump 21 to conduit 61. End housing 44 also includes conduit 63 which extends from pressure regulator 32 into alignment with axial bore 48 in shaft 20. Finally pump housing 43 includes conduit 64 which is connected to inlet port 22 of pump 21.

Usually the capacity of pump 28 for extracting oil from the housing is greater than the capacity of pump 21 taken with regulator 32 for pumping oil into the housing in order to ensure that all of the oil entering the housing is scavenged. As a result, a slight vacuum will be present in the housing. To control this vacuum, manually adjustable vent 27 in the housing may be provided.

In operation, alternator 10 is securely bolted to engine 15 with coupling 12' connected to the engine so that shaft 20 is driven by the engine. Pump 21 is effective, when shaft 20 is rotated by the engine, to draw oil from crankcase sump 16 and pump this oil via conduit 62 into pressure regulator 32. This pressure regulator stabilizes the pressure in conduit 63 at a predetermined level in accordance with the setting of the regulator. A predetermined amount of oil thus flows through pressure regulator 32 into conduit 63, the balance of the oil pumped by pump 21 flowing through through conduit 61 into conduit 60 from which the balance of the oil is returned to the crankcase sump. In the event of a situation in which blockage may occur in the various conduits, pressure relief valve 33 is effective to vent oil from conduit 61.

In normal operation, the oil pumped by pump 21 into conduit 63 flows into axial bore 48 and is sprayed by reason of radial apertures 54 and 55 into the cavity of housing 42 and into direct engagement with both the rotor and stator cooling these components. Some of the oil is also applied to bearing 53 for lubrication purposes.

After the oil is sprayed on the movable and fixed components of the alternator, the excess oil drains into the bottom of housing 42 forming a sump. Conduit 58 is connected to conduit 31. Pump 28 is effective to draw oil in the alternator sump into conduit 59 and thence into conduit 60 in order to return the oil to crankcase sump 16. Conduit 58 is preferably designed to reach the center of the bottom of alternator housing 42 in order to ensure that oil is collected even when the vehicle and consequently the alternator operating in the vehicle is tilted from the horizontal. Nozzle 27 is provided for maintaining the desired pressure in alternator housing 42. Vacuum conditions prevail in the alternator housing due to the high design flow rate of pump 28 and nozzle 27 permits air to enter housing 42 to thus maintain the desired pressure in the housing.

While FIG. 1 shows, and the description describes an arrangement in which oil is pumped into and out of the crankcase sump of an engine, the present invention is also applicable to engines that utilize an external oil reservoir. Such reservoirs are sometimes found in certain marine engines, and engines for special purpose vehicles. In such case, the external oil reservoir may constitute the sump with which oil is exchanged by the alternator pumps as shown in FIG. 2.

Finally, the term "alternator" is used herein as a generic designation for the electrical apparatus by which current is generated by the engine of a vehicle for use by the vehicle. It is intended to cover both apparatus that develops alternating current, and apparatus that develops direct current. Thus, the term is used to refer to both an alternator and a generator.

It should be pointed out that while alternator housing 40 can be constructed from three, four of more main portions if necessary, an alternator constructed in accordance with the presently considered best mode of the present invention comprises three main portions as shown in FIG. 2. Such a construction facilitates assembly of the alternator and permits pump housing 43 to be easily assembled as a separate part before being connected the other portions of the alternator. This also simplifies maintenance operations. Here preferably shaft 20 can be constructed from two parts with one part being contained in the pump housing and the other passing through main housing 42.

The advantages and improved results furnished by the method and apparatus of the present invention are apparent form the foregoing description of the preferred embodiment of the invention. Various changes and modifications may be made without departing from the spirit and scope of the invention as described in the appended claims.

What is claimed is:

1. Apparatus including:
   (a) housing defining an interior cavity;
   (b) a shaft having an axial bore rotatably mounted in said housing and passing through said cavity, said shaft having axial ends;
   (c) a alternator in said cavity for generating electrical power in response to rotation of said shaft including a rotor rigidly mounted on said shaft, and a stator rigidly mounted on said housing in operative relationship to said rotor;
   (d) pump means, internal to said housing, for pumping oil into said axial bore and for removing oil from said cavity;
   (e) said shaft having apertures for effecting the spraying of oil from said bore into said cavity for cooling said rotor and stator; and
   (f) wherein said pump means includes a first pump for pumping oil into said axial bore, and second pump for purging oil from said cavity, each pump having a rotor rigidly attached to said shaft.

2. Apparatus according to claim 1, including a pressure regulator responsive to the operation of said first pump for regulating the pressure of oil flowing into said axial bore.

3. Apparatus according to claim 2, including a bypass conduit for effecting the passage of oil from said cavity when the pressure exceeds a threshold.

4. Apparatus according to claim 3, including a pressure relief valve associated with said bypass conduit.

5. Apparatus according to claim 1 wherein said pump apparatus is mounted internal to said housing.

6. Apparatus according to claim 1, wherein each pump has a rotor rigidly attached to said shaft on the same axial end of said shaft.

7. Apparatus according to claim 1, wherein said first pump is adjacent an axial end of the shaft.

8. In combination:
   (a) an internal combustion engine having a lubrication system that includes a crankcase sump for containing lubricating oil, and means for lubricating the engine with oil from said sump;
   (b) a alternator having an input shaft for generating power in response to rotation of the shaft;
   (c) means for coupling the input shaft to the engine so that operation thereof drives the alternator;
   (d) a rotatable pump having inlet and outlet ports;
   (e) means coupling said pump to said shaft for effecting rotation of the pump in response to rotation of said shaft;
   (f) means connecting the inlet port of said pump to said sump; and
   (g) means connecting the outlet port of the pump to spray means directed toward said alternator for cooling the same with oil from said sump;
   (h) said alternator including a housing having a cavity, bearing means rotatably mounting said input shaft in said cavity, a rotor in said cavity rigidly connected to said shaft for rotation therewith, and a stator in said cavity mounted on said housing, said shaft having axial ends that extend beyond each and of the rotor, an axial bore connected to the outlet of said pump, and apertures in the axial ends of said shaft for spraying oil in said cavity and cooling said rotor and stator; and
   (i) wherein said cavity has a sump for collecting sprayed oil, and further including a second pump for returning oil to the sump in the cavity to the crankcase sump.

9. The combination of claim 8, wherein a second pump is coupled to said shaft, and has inlet and outlet ports, the inlet of said second pump being connected to the sump in said housing, and outlet of the second pump being connected to the crankcase sump for returning oil thereto.

10. Apparatus according to claim 9, wherein said rotatable pump is located in said housing.

11. The combination of claim 10, wherein said second pump is located in said housing.

12. In combination:
   (a) an internal combustion engine having a lubrication system that includes a crankcase sump for containing lubricating oil, and means for lubricating the engine with oil from said sump;
   (b) a alternator having an input shaft for generating power in response to rotation of the shaft;
   (c) means for coupling the input shaft to the engine so that operation thereof drives the alternator;
   (d) a rotatable pump having inlet and outlet ports;
   (e) means coupling said pump to said shaft for effecting rotation of the pump in response to rotation of said shaft;
   (f) means connecting the inlet port of said pump to said sump; and
   (g) means connecting the outlet port of the pump to spray means directed toward said alternator for cooling the same with oil from said sump;
   (h) said alternator including a housing having a cavity, bearing means rotatably mounting said input shaft in said cavity, a rotor in said cavity rigidly connected to said shaft for rotation therewith, and a stator in said cavity mounted on said housing, said shaft having axial ends that extend beyond each and of the rotor, an axial bore connected to the outlet of said pump, and apertures in the axial ends of said shaft for spraying oil in said cavity and cooling said rotor and stator; and
   (i) a pressure regulator interposed between the outlet port of said rotatable pump and the axial bore in said shaft.

13. The combination of claim 12, including a pressure relief valve of interposed between the outlet port of said rotatable pump and said crankcase sump.

14. A method for cooling the alternator of an internal combustion engine comprising the steps of:
   (a) pumping oil from the crankcase sump of the engine into the interior of said alternator;
   (b) collecting oil in the interior of said alternator; and
   (c) purging collected oil back to the crankcase sump; and
   (d) using one pump to pump oil from the crankcase sump, and using another pump to pump oil back to the crankcase sump.

15. A method according to claim 14, including mechanically coupling said pumps and said alternator to a shaft.

16. A method according to claim 14 wherein each pump is mounted in the interior of said alternator.

17. Apparatus including:
   (a) a housing defining an interior cavity;

(b) a shaft having an axial bore rotatably mounted in said housing and passing into said cavity, said shaft having axial ends;

(c) a alternator in said cavity for generating electrical power in response to rotation of said shaft including a rotor rigidly mounted on said shaft, and a stator rigidly mounted on said housing in operative relationship to said rotor; and (d) a first pump mounted on said shaft and responsive to rotation for pumping oil into said axial bore, and a second pump mounted on said shaft and responsive to rotation for removing oil from said cavity;

(e) said shaft having apertures which effect the spraying of oil from said bore into said cavity for cooling said rotor and stator.

* * * * *